(12) United States Patent
Gao et al.

(10) Patent No.: US 8,861,547 B2
(45) Date of Patent: Oct. 14, 2014

(54) METHOD, APPARATUS, AND SYSTEM FOR PACKET TRANSMISSION

(75) Inventors: Zhonghua Gao, Beijing (CN); Zhaoyan Lei, Beijing (CN)

(73) Assignee: Hangzhou H3C Technologies Co., Ltd., Zhejiang (CN)

( * ) Notice: Subject to any disclaimer, the term of this patent is extended or adjusted under 35 U.S.C. 154(b) by 353 days.

(21) Appl. No.: 12/550,241

(22) Filed: Aug. 28, 2009

(65) Prior Publication Data

US 2010/0118882 A1 May 13, 2010

(30) Foreign Application Priority Data

Nov. 10, 2008 (CN) .......................... 2008 1 0226240

(51) Int. Cl.
- *H04L 29/02* (2006.01)
- *H04L 12/46* (2006.01)
- *H04L 12/54* (2013.01)

(52) U.S. Cl.
CPC .................................. *H04L 12/4633* (2013.01)
USPC .......................... 370/469; 370/392; 370/395.5

(58) Field of Classification Search
None
See application file for complete search history.

(56) References Cited

U.S. PATENT DOCUMENTS

| | | | |
|---|---|---|---|
| 6,463,475 B1 | 10/2002 | Calhoun | |
| 6,614,809 B1 | 9/2003 | Verma et al. | |
| 6,654,792 B1 | 11/2003 | Verma et al. | |
| 6,704,282 B1 | 3/2004 | Sun et al. | |
| 6,732,314 B1 | 5/2004 | Borella et al. | |
| 6,763,018 B1 | 7/2004 | Puthiyandyil et al. | |
| 6,917,592 B1 | 7/2005 | Ramankutty et al. | |
| 6,950,862 B1 | 9/2005 | Puthiyandyil et al. | |
| 6,996,110 B1 | 2/2006 | Amara et al. | |
| 7,062,566 B2 | 6/2006 | Amara et al. | |
| 7,225,236 B1 | 5/2007 | Puthiyandyil et al. | |
| 7,248,561 B2 * | 7/2007 | Ishibashi et al. .............. | 370/228 |
| 7,330,453 B1 | 2/2008 | Borella et al. | |
| 7,450,560 B1 | 11/2008 | Grabelsky et al. | |
| 8,130,671 B2 | 3/2012 | Park et al. | |
| 2003/0028648 A1 | 2/2003 | Calhoun | |

(Continued)

FOREIGN PATENT DOCUMENTS

| | | |
|---|---|---|
| CN | 1770718 | 5/2006 |
| CN | 1863151 | 11/2006 |
| CN | 101222437 | 7/2008 |
| EP | 1890458 | 2/2008 |

OTHER PUBLICATIONS

R. Braden, et. al., "Resource ReSerVation Protocol (RSVP)—Version 1 Functional Specification," Network Working Group, Sep. 1997.

D. Awduche, et al., "RSVP-TE: Extensions to RSVP for LSP Tunnels," Network Working Group, Dec. 2001.D.

(Continued)

*Primary Examiner* — John Pezzlo
*Assistant Examiner* — Matthew Campbell (57) ABSTRACT

This invention discloses a method, apparatus, and system for packet transmission. The method for packet transmission includes: configuring the two logical interfaces of a bidirectional tunnel to operate in bridge mode; at the first logical interface of the two, encapsulating Layer 2 packets and the protocol type information in tunnel packets and transmitting the packets to the peer through the bidirectional tunnel; at the second logical interface of the two, transmitting the tunnel packets to the corresponding Layer 2 protocol stack for processing according to the protocol type information in the received tunnel packets. The present invention enables the logical interfaces of a bidirectional tunnel to operate as Layer 2 ports to transmit Layer 2 packets.

16 Claims, 3 Drawing Sheets

(56) References Cited

U.S. PATENT DOCUMENTS

2004/0037296 A1* 2/2004 Kim et al. ............... 370/395.53
2004/0076151 A1* 4/2004 Fant et al. .................. 370/395.5
2008/0144641 A1* 6/2008 Le Roux et al. ............. 370/401
2009/0303990 A1* 12/2009 Ambrose et al. ............. 370/389

OTHER PUBLICATIONS

A. Farrel, et al., "Encoding of Attributes for Multiprotocol Label Switching (MPLS) Label Switched Path (LSP) Establishment Using Resource ReserVation Protocol-Traffic Engineering (RSVP-TE)," Network Working Group, Feb. 2006.

* cited by examiner

METHOD, APPARATUS, AND SYSTEM FOR PACKET TRANSMISSION

TECHNICAL FIELD

This invention relates in general to the field of tunneling technologies and more particularly to a method, apparatus, and system for packet transmission.

BACKGROUND OF THE INVENTION

Fast applications growth and network expansion speed up the development of the Virtual Private Network (VPN) technology to save the IP address resources and secure private networks, and thus promotes the fast development of tunneling technologies.

Among the existing tunneling implementations, some bidirectional tunnels are configured with the corresponding logical interfaces at both ends to transmit traffic in between, thus facilitating the deployment of some network applications. For example, you can run routing, multicast, and LDP protocols on the directly-connected logical interfaces of a bidirectional tunnel, making the traffic pass the tunnel easily; for another example, a tunnel spans an IPv4 public network, but the logical interfaces of the tunnel can run IPv6 protocols to implement IPv6 over IPv4; additionally, the logical tunnel interfaces can be bound to VPNs and run routing protocols, thus implementing interconnection between multiple VPN nodes.

Figure 1:
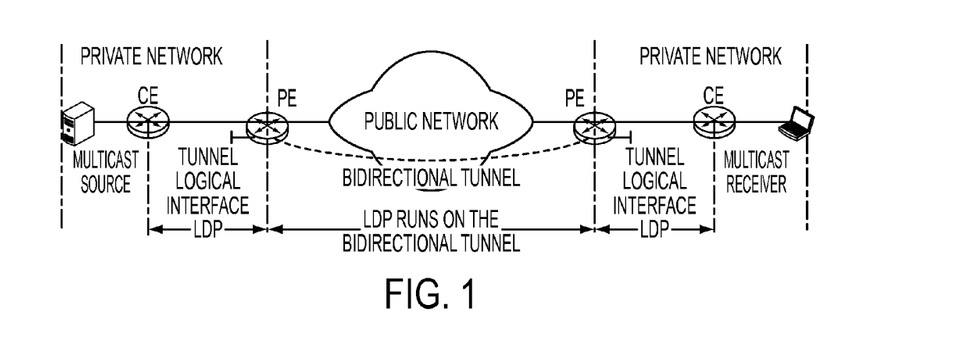
FIG. 1 is the schematic diagram illustrating application instance 1 where the logical interfaces of a bidirectional tunnel operate as Layer 3 interfaces.

The logical interfaces of the existing bidirectional tunnels operate as Layer 3 interfaces at the network layer. FIG. 1 is the schematic diagram illustrating application instance I where the logical interfaces of a bidirectional tunnel operate as Layer 3 interfaces. As shown in FIG. 1, a bidirectional tunnel spanning the public network is set up between two PE devices, and the logical interfaces at both ends of the tunnel are bound to the VPN routing and forwarding (VRF) tables of the private networks. In this way, there is a pair of directly-connected P2P interfaces between the VRF tables of the private networks. By running a routing protocol on the logical interfaces of the bidirectional tunnel, you can make the private networks reachable to each other over the tunnel, thus implementing a simple VPN scheme. By running the LDP protocol on the logical interfaces of the bidirectional tunnel, you can easily get the MPLS LDP LSPs of different VPN nodes, and thus easily deploy the networking scheme of the service provider. By running a multicast routing protocol on the logical interfaces of the bidirectional tunnel, you can also deploy a simple multicast VPN.

In a similar way, you can configure another bidirectional tunnel on the same public network, and run routing, multicast, and LDP protocols on it.

Figure 2:
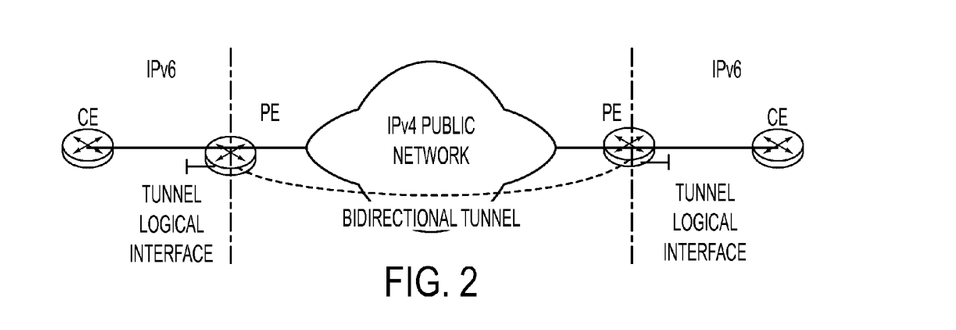
FIG. 2 is the schematic diagram illustrating application instance 2 where the logical interfaces of a bidirectional tunnel operate as Layer 3 interfaces.

FIG. 2 is the schematic diagram illustrating application instance II where the logical interfaces of a bidirectional tunnel operate as Layer 3 interfaces. You can use the bidirectional tunnel and its logical interfaces to implement networking schemes such as IPv6 over IPv4 and IPv4 over IPv6. To do that in FIG. 2, you need only configure IPv6 addresses for the logical interfaces and run IPv6 routing protocols on them.

However, the existing bidirectional tunnel logical interfaces as previously understood by the inventor of the present invention can operate only as Layer 3 interfaces. At Layer 2, Layer 2 tunneling is required to span a public network.

SUMMARY OF THE INVENTION

The present invention provides two packet transmission methods, enabling the logical interfaces of a bidirectional tunnel to operate as Layer 2 ports to transmit Layer 2 packets.

The present invention provides two packet transmission apparatuses, enabling the logical interfaces of a bidirectional tunnel to operate as Layer 2 ports to transmit Layer 2 packets.

The present invention provides a packet transmission system, enabling the logical interfaces of a bidirectional tunnel to operate as Layer 2 ports to transmit Layer 2 packets.

To achieve the above purposes, the present invention is implemented as follows:

The present invention discloses a packet transmission method, which specifies the first logical interface of the two logical interfaces of a bidirectional tunnel as belonging to the first device and comprises that:

the first device configures the first logical interface to operate in bridge mode;

the first device encapsulates the Layer 2 packets and their protocol type information in the tunnel packets, and sends the tunnel packets to the specified bidirectional tunnel through the first logical interface.

The present invention also discloses the other packet transmission method, which specifies the second logical interface of the two logical interfaces of a bidirectional tunnel as belonging to the second device and comprises that:

the second device configures the second logical interface to operate in bridge mode;

the second device, upon receiving the tunnel packets on the second logical interface, sends the tunnel packets to the corresponding Layer 2 protocol stack for processing according to the protocol type information in the tunnel packets.

The present invention discloses a packet transmission apparatus, to which the first logical interface of the two logical interfaces of a specified bidirectional tunnel belongs. The apparatus comprises a setting module and a transmitting module, wherein the setting module is used to configure the first logical interface to operate in bridge mode, and notify the transmitting module;

the transmitting module, upon receiving the notification, encapsulates the Layer 2 packets and their protocol type information in the tunnel packets, and sends the tunnel packets to the specified bidirectional tunnel through the first logical interface.

The present invention also discloses the other packet transmission apparatus, to which the second logical interface of the two logical interfaces of a specified bidirectional tunnel belongs. The apparatus comprises a setting module and a receiving module, wherein the setting module is used to configure the second logical interface to operate in bridge mode, and notify the receiving module;

the receiving module, after receiving the notification, sends the tunnel packets received on the second logical interface to the corresponding Layer 2 protocol stack for processing according to the protocol type information in the tunnel packets.

The present invention also discloses a packet transmission system, which comprises the first device having the first logical interface and the second device having the second logical interface. The first logical interface and second logical interface are logical interfaces at the two ends of a bidirectional tunnel, the first device configures the first logical interface to operate in bridge mode, and the second device configures the second logical interface to operate in bridge mode.

The first device is used to encapsulate the Layer 2 packets and their protocol type information in the tunnel packets and send the tunnel packets to the bidirectional tunnel through the first logical interface.

Upon receiving the tunnel packets on the second logical interface, the second device sends the tunnel packets to the corresponding Layer 2 protocol stack for processing according to the protocol type information in the tunnel packets.

As is apparent from the technical proposal above, the present invention configures the two logical interfaces of a bidirectional tunnel to operate in bridge mode, encapsulates Layer 2 packets and the protocol type information in tunnel packets at the first logical interface of the two, and transmits the packets to the peer through the bidirectional tunnel; when receiving the tunnel packets at the second logical interface of the two, the present invention transmits the tunnel packets to the corresponding Layer 2 protocol stack for processing according to the protocol type information in the received tunnel packets, thus enabling the logical interfaces of a bidirectional tunnel to operate as Layer 2 ports and transmit Layer 2 packets.

DETAILED DESCRIPTION OF THE EMBODIMENTS

If the logical interfaces of a bidirectional tunnel can be changed into Layer 2 ports, they can act as directly-connected Layer 2 tunnel ports spanning the public network. According to the implementation principles, the setup of a tunnel is independent of the operating mode of corresponding tunnel interfaces. Therefore, the present invention modifies the packet receiving/sending procedure of the logical interfaces of a bidirectional tunnel to make them operate as Layer 2 ports.

Among the existing technologies, generic routing encapsulation (GRE) tunnels are bidirectional tunnels, while the traffic engineering (TE) tunnels are usually unidirectional tunnels. Because the present invention aims at changing the logical interfaces of a bidirectional tunnel into Layer 2 ports and TE tunnels are widely used in actual applications, the following part first illustrates how to set up bidirectional TE tunnels, and then presents the core of the present invention, that is, the scheme for configuring the logical interfaces of a bidirectional tunnel (GRE tunnel or bidirectional TE tunnel) to operate as Layer 2 ports for transmitting Layer 2 packets.

The scheme for setting up a bidirectional TE tunnel comprises the following steps:

I. Configuring the Bidirectional TE Tunnel ID

As multiple bidirectional TE tunnels can be set up between two devices, you need to configure bidirectional TE tunnel IDs to identify different bidirectional TE tunnels between two devices. Configure bidirectional TE tunnel IDs according to the following principles: do not configure the same bidirectional TE tunnel ID for two TE tunnel logical interfaces on the same device; on two devices, only two tunnel logical interfaces with the same bidirectional TE tunnel ID can form a pair of directly-connected bidirectional P2P tunnel interfaces.

II. Configuring a Source IP Address

The existing TE tunnels are unidirectional. Therefore, you need not configure source IP addresses for their logical interfaces. In the present invention, however, after configuring these logical interfaces as bidirectional tunnel logical interfaces, you need to configure source IP addresses and destination IP addresses for them. This is because: to make two logical tunnel interfaces form a pair of directly-connected bidirectional P2P tunnel interfaces, the source IP address of a logical tunnel interface must be the destination IP address of the other logical tunnel interface, and vice versa.

III. Extending the Signaling Protocol Resource Reservation Protocol (RSVP) to Support Bidirectional TE Tunnels To support bidirectional TE tunnels, you need to extend the signaling protocol RSVP to make the RSVP PATH messages and RSVP RESV messages carry bidirectional TE tunnel IDs.

In an embodiment of the present invention, a BIDIRECTIONAL_ATTRIBUTE object is added to the RSVP PATH message and RSVP RESV message, and the bidirectional TE tunnel ID of the head-end logical interface is filled in the BIDIRECTIONAL_ATTRIBUTE field, indicating that a bidirectional TE tunnel is to be set up. In an embodiment of the present invention, the value attribute (that is, the content) of the BIDIRECTIONAL_ATTRIBUTE object is of four bytes, whose format is shown in FIG. 3.

Figure 3:
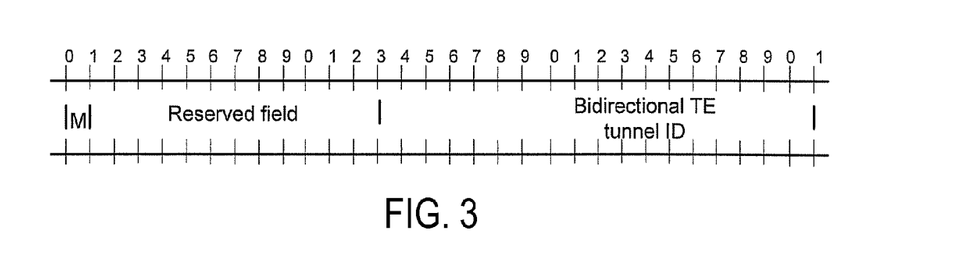
FIG. 3 illustrates the format of the BIDIRECTIONAL_ATTRIBUTE according to an embodiment of the present invention.

FIG. 3 illustrates the format of the BIDIRECTIONAL_ATTRIBUTE according to an embodiment of the present invention. As shown in FIG. 3, the highest-order bit M indicates the operating mode of the current bidirectional tunnel logical interface: the value 0 indicates the route mode, and the value 1 indicates the bridge mode; the field after M is reserved, and the bidirectional TE tunnel ID is after the reserved field. The length of the reserved field and that of the bidirectional TE tunnel ID field are configurable depending on the conditions.

Additionally, the embodiments of the present invention extend the ERROR_SPEC object and add the error codes related to bidirectional TE tunnels. To be specific, the Error Code 24 "Routing Problem" and Error Code 11 "Unsupported Bidirectional Tunnel" are added. "Unsupported Bidirectional Tunnel" indicates that the bidirectional TE tunnel failed to be set up.

Based on the points mentioned above, the following part further describes the technical proposal of the present invention with an example of setting up a specific bidirectional TE tunnel.

In this example, logical interface a resides on Device A, and logical interface b resides on device B.

In accordance with the technical proposal of the present invention, first configure the same bidirectional TE tunnel ID for logical interfaces a and b, and assign a source IP address and destination address for logical interface a and logical interface b respectively, with the source IP address of logical interface a as the destination IP address of logical interface b and the source IP address of logical interface b as the destination IP address of logical interface a; configure logical interface a as a bidirectional TE tunnel logical interface on device A and logical interface b as a bidirectional TE tunnel logical interface on device B respectively. The subsequent processing is as follows:

a. Processing on Device A

Device A sends to device B a RSVP PATH message, which carries the bidirectional TE tunnel ID and source IP address of logical interface a. Wherein, the bidirectional TE tunnel ID of logical interface a is carried in the BIDIRECTIONAL_ATTRIBUTE object in the RSVP PATH message, and the BIDIRECTIONAL_ATTRIBUTE object also carries the operating mode flag of logical interface a. For details, refer to FIG. 3. The source IP address of logical interface a is carried in the EXTENDED TUNNEL ID field in the SESSION object of the RSVP PATH message. The RSVP PATH message is transmitted to device B.

When device A receives a RSVP RESV message from downstream and the RSVP RESV message carries the BIDIRECTIONAL_ATTRIBUTE object whose content is not changed, the bidirectional TE tunnel corresponding to logical interface a has been set up. Herein, the RSVP RESV message is sent by device B according to the RSVP PATH message, which will be described in the following part.

b. Processing on Device B

When device B receives from device A a RSVP PATH message, which carries the BIDIRECTIONAL_ATTRIBUTE object, device B can be sure that the peer device (that is, device A) is to set up a bidirectional TE tunnel. In this case, the signaling protocol RSVP module of device B confirms the following procedure with the TE logical tunnel interface management module:

1) Searches the logical interfaces of the local enabled bidirectional TE tunnels, and judges whether there is a logical interface with the same bidirectional TE tunnel ID and operating mode as those carried in the BIDIRECTIONAL_ATTRIBUTE object in the RSVP PATH message. If a match is found, proceeds with step 2). Otherwise, uses the RSVP PATH ERROR message to return error code "Unsupported Bidirectional Tunnel".

2) Judges whether the source IP address in the EXTENDED TUNNEL ID field in the SESSION object carried in the RSVP PATH message is the same as the destination IP address of the local logical interface. If yes, device B returns a RSVP RESV message to the peer device and establishes an entry for the bidirectional TE tunnel at the forwarding plane. The RSVP RESV message carries the same BIDIRECTIONAL_ATTRIBUTE object and a non-null MPLS label assigned to the bidirectional TE tunnel. Hereto, a bidirectional TE tunnel has been successfully set up between logical interface a and logical interface b. If not, device B uses the RSVP PATH ERROR message to return error code "Unsupported Bidirectional Tunnel".

c. Processing on the Intermediate Devices (Devices Between Device A and Device B)

In the embodiments of the present invention, the intermediate devices cannot sense the bidirectional TE tunnel functions. If an intermediate device receives a RSVP PATH message carrying the BIDIRECTIONAL_ATTRIBUTE object, the device directly transmits the message.

A bidirectional TE tunnel can be set up in accordance with the above technical proposal.

The following part describes the technical proposal for configuring the bidirectional tunnel logical interfaces as Layer 2 ports. The bidirectional tunnels mentioned here contain the bidirectional TE tunnels set up in accordance with the above technical proposal.

Figure 4:
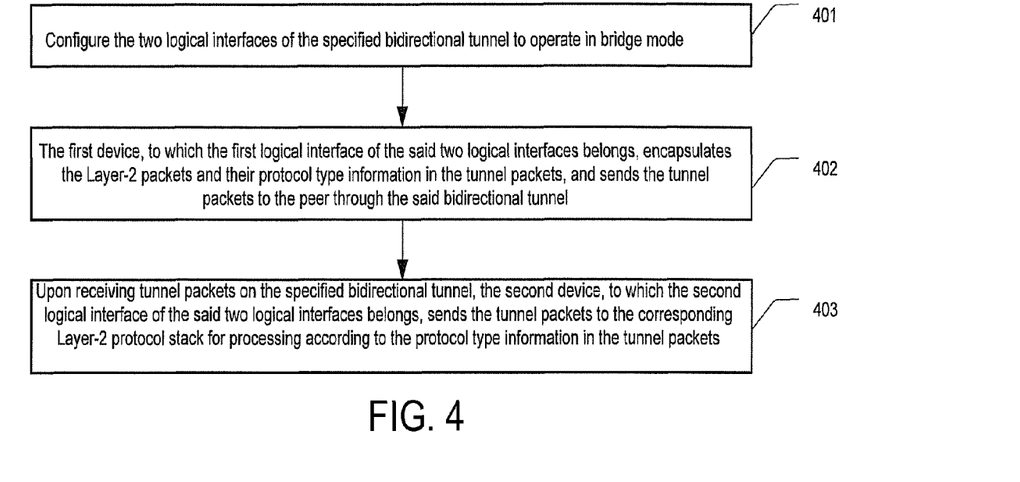
FIG. 4 illustrates a flow chart of packet transmission in accordance with an embodiment of the present invention.

FIG. 4 illustrates a flow chart of packet transmission in accordance with the embodiments of the present invention. As shown in FIG. 4, the method comprises the following steps:

At step 401, configure the two logical interfaces of the specified bidirectional tunnel to operate in bridge mode.

In the present invention, use the related operating mode configuration commands to configure the operating modes of the bidirectional tunnel logical interfaces.

In an embodiment of the present invention, use the port link-mode route command to configure an interface to operate in route mode and use the port link-mode bridge command to configure an interface to operate in bridge mode. By default, the bidirectional tunnel logical interfaces operate in route mode, that is, the logical interfaces operate as Layer 3 P2P interfaces. If you configure the port link-mode bridge command on a bidirectional tunnel logical interface, its operating mode is changed from route mode to bridge mode, and it operates as a Layer 2 Ethernet port.

When you switch the operating mode of a bidirectional TE tunnel logical interface, the logical interface will go down at the data link layer, that is, the bidirectional TE tunnel will fail and be set up again. As mentioned above, the two parties perform signaling negotiation during setting up a bidirectional TE tunnel, and thus the operating mode of the logical interfaces will be set to bridge mode after negotiation (that is, the highest-order bit M in the BIDIRECTIONAL_ATTRIBUTE object in the RSVP PATH message is set to 1). Of course, you can also configure the two logical interfaces to operate in bridge mode before the first signaling negotiation procedure of setting up the bidirectional TE tunnel.

For a GRE tunnel, no signaling negotiation is performed when the GRE tunnel is set up. Therefore, even if the two logical interfaces of the GRE tunnel operate in different modes, the logical interfaces can go up, that is, the logical interfaces can work normally, however, the services cannot run normally.

At step 402, the first device, to which the first logical interface of the two logical interfaces belongs, encapsulates the Layer 2 packets and their protocol type information in the tunnel packets, and sends the tunnel packets to the specified bidirectional tunnel through the bidirectional tunnel.

In the present invention, when the logical interfaces of a bidirectional tunnel operate in bridge mode, their attributes and functions are the same as those of a common Layer 2 Ethernet port. For example, they can learn MAC addresses, and forward Layer 2 packets within VLANs. Therefore, when the outgoing interface of a Layer 2 Ethernet frame searched in the Layer 2 forwarding table is a bidirectional tunnel logical interface operating in bridge mode, the Layer 2 Ethernet frame and its protocol information is encapsulated in a tunnel packet and then sent to the bidirectional tunnel.

In the embodiments of the present invention, the bidirectional tunnels can be GRE tunnels or bidirectional TE tunnels. When a Layer 2 Ethernet frame is transmitted over a GRE tunnel or bidirectional TE tunnel, the protocol type of its payload must be indicated. Therefore, in the present invention, the Layer 2 Ethernet frame and its protocol type information (0x88c9) is encapsulated in a tunnel packet and then sent to the bidirectional tunnel. In an embodiment of the present invention, the protocol type information is written in the protocol type field of the GRE tunnel encapsulation information/bidirectional TE tunnel interface encapsulation information.

At step 403, upon receiving the tunnel packets on the specified bidirectional tunnel, the second device, to which the second logical interface of the two logical interfaces belongs, sends the tunnel packets to the corresponding Layer 2 protocol stack for processing according to the protocol type information in the tunnel packets.

At this step, upon receiving the tunnel packets on the specified bidirectional tunnel, the second device resolves the protocol type information in the GRE tunnel encapsulation information/bidirectional TE tunnel interface encapsulation information in the tunnel packets and sends the tunnel packets to the corresponding Layer 2 protocol stack for processing. For example, if a packet is resolved as a Layer 2 Ethernet frame, it is sent to the Layer 2 forwarding module for processing.

The technical proposal mentioned above enables the logical interfaces of a bidirectional tunnel to operate as Layer 2 ports to transmit Layer 2 packets.

Because Layer 2 bidirectional tunnel logical interfaces (that is, bidirectional tunnel logical interfaces operating in bridge mode) basically function the same as common Layer 2 Ethernet ports, common applications can be deployed on Layer 2 bidirectional tunnel logical interfaces. Layer 2 bidirectional tunnel logical interfaces support all the functions of common Layer 2 Ethernet ports. For Layer 2 bidirectional tunnel logical interfaces, you can set the access/trunk/hybrid attribute, enable loop detection protocols such as STP or RRPP, configure smart link (a fast switchover feature) and QinQ, and so on.

Figure 5:
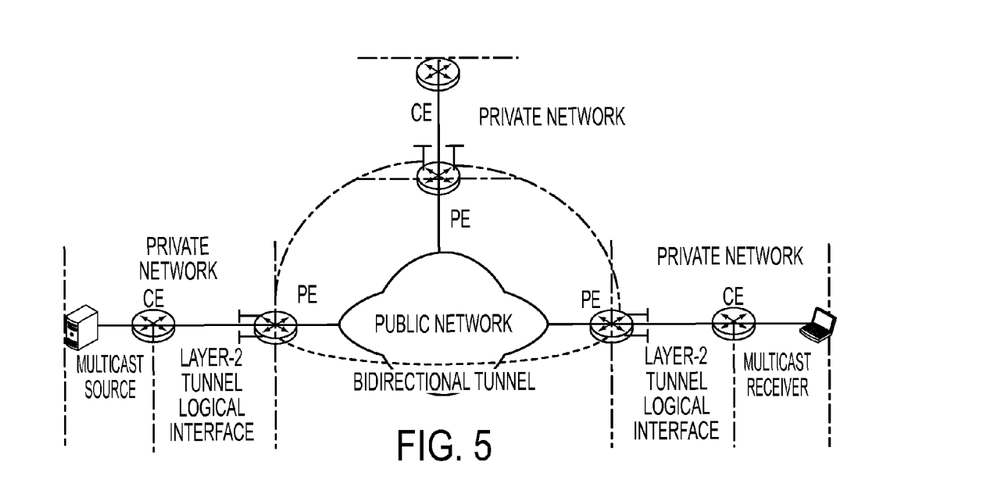
FIG. 5 is the schematic diagram illustrating an application instance where the logical interfaces of a bidirectional tunnel operate as Layer 2 interfaces in accordance with an embodiment of the present invention.

As Layer 2 tunnel logical interfaces span across the public network, many services can be deployed easily. FIG. 5 is the schematic diagram illustrating an application instance where the logical interfaces of a bidirectional tunnel operate as Layer 2 interfaces in accordance with an embodiment of the present invention. As shown in FIG. 5, two PEs set up a bidirectional tunnel spanning the public network, and the Layer 2 tunnel logical interfaces are bound to the virtual forwarding instance (VSI). Besides, the Layer 2 Ethernet port of the PE which connects to the CE is also bound to the VSI. In this way, a VPLS L2VPN is deployed. On the Layer 2 logical interfaces, you can enable STP or RRPP to eliminate Layer 2 loops, or use IGMP snooping to implement Layer 2 multicast on the L2VPN.

Figure 6:
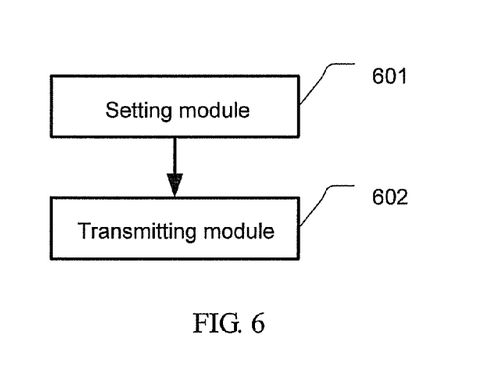
FIG. 6 is the block diagram of the packet transmission apparatus in accordance with embodiment 1 of the present invention.

FIG. 6 is the block diagram of the packet transmission apparatus in accordance with embodiment 1 of the present invention. As shown in FIG. 6, the device, to which the first logical interface of the two logical interfaces of the specified bidirectional tunnel belongs, comprises the setting module 601 and the transmitting module 602, wherein:

the setting module 601 is used to configure the first logical interface to operate in bridge mode, and notify the transmitting module 602;

upon receiving the notification, the transmitting module 602 encapsulates the Layer 2 packets and their protocol type information in the tunnel packets, and sends the tunnel packets to the specified bidirectional tunnel through the first logical interface.

In the device shown in FIG. 6, the first logical interface operates in route mode by default; the setting module 601 is used to change the operating mode of the first logical interface from route to bridge upon receiving the switchover instruction, and notify the transmitting module.

The device shown in FIG. 6 further comprises the learning enabling module, which is not drawn in FIG. 6. The learning enabling module is used to enable MAC learning on the first logical interface and thus enable the first logical interface to forward Layer 2 packets.

Figure 7:
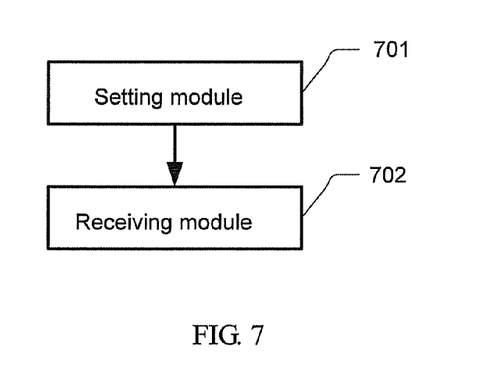
FIG. 7 is the block diagram of the packet transmission apparatus in accordance with embodiment 2 of the present invention.

FIG. 7 is the block diagram of the packet transmission apparatus in accordance with embodiment 2 of the present invention. As shown in FIG. 7, the device, to which the second logical interface of the two logical interfaces of the specified bidirectional tunnel belongs, comprises the setting module 701 and the receiving module 702, wherein:

the setting module 701 is used to configure the second logical interface to operate in bridge mode, and notify the receiving module 702;

after receiving the notification, the receiving module 702 sends the tunnel packets received on the second logical interface to the corresponding Layer 2 protocol stack for processing according to the protocol type information in the tunnel packets.

In the device shown in FIG. 7, the second logical interface operates in route mode by default; the setting module 701 is used to change the operating mode of the second logical interface from route to bridge upon receiving the switchover instruction, and notify the receiving module.

Figure 8:
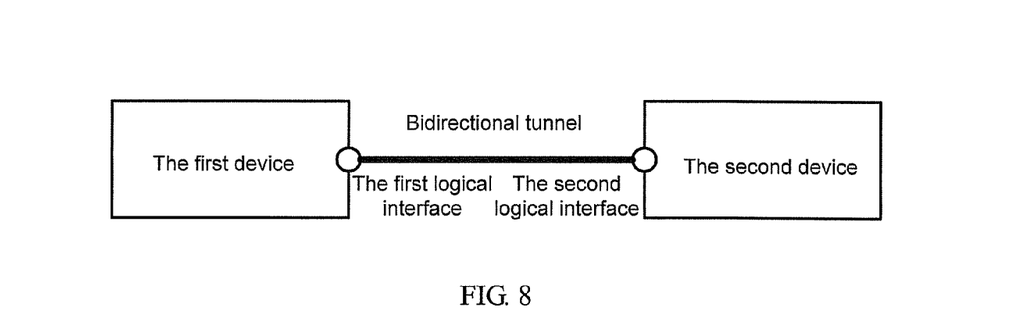
FIG. 8 is the block diagram of the packet transmission system in accordance with an embodiment of the present invention.

FIG. 8 is the block diagram of the packet transmission system in accordance with the embodiments of the present invention. The system shown in FIG. 8 comprises the first device having the first logical interface and the second device having the second logical interface, where the first logical interface and second logical interface are logical interfaces at the two ends of a bidirectional tunnel, the first device configures the first logical interface to operate in bridge mode, and the second device configures the second logical interface to operate in bridge mode.

The first device is used to encapsulate the Layer 2 packets and their protocol type information in the tunnel packets and send the tunnel packets to the bidirectional tunnel through the first logical interface.

Upon receiving the tunnel packets on the second logical interface, the second device sends the tunnel packets to the corresponding Layer 2 protocol stack for processing according to the protocol type information in the tunnel packets.

In the system shown in FIG. 8, the first logical interface and second logical interface are logical interfaces at the two ends of a bidirectional tunnel; the first device configures the first logical interface to operate in bridge mode and the second device configures the second logical interface to operate in bridge mode as follows:

Configure the same bidirectional TE tunnel ID for the first logical interface and the second logical interface, and assign a source IP address and destination IP address for the first logical interface and the second logical interface respectively, with the source IP address of the first logical interface as the destination IP address of the second logical interface and the source IP address of the second logical interface as the destination IP address of the first logical interface;

The first device configures the first logical interface to operate in bridge mode according to the instruction; the second device configures the second logical interface to operate in bridge mode according to the instruction;

The first device sends to the second device a RSVP PATH message, which carries the bidirectional TE tunnel ID, source IP address, and operating mode flag of the first logical interface;

Upon receiving the RSVP PATH message, the second device judges whether there is a local logical interface with the same bidirectional TE tunnel ID as that carried in the RSVP PATH message. If yes, the second device further judges whether the destination IP address of the logical interface is the same as the source IP address in the RSVP PATH message and the operating mode of the logical interface is the same as the operating mode flag carried in the RSVP PATH message. If yes, the second device sends to the first device a RSVP RESV message carrying the bidirectional TE tunnel ID and source IP address of the first logical interface;

Upon receiving the RSVP RESV message, the first device can be sure that a bidirectional TE tunnel has been set up between the first logical interface and the second logical interface.

To sum up, the embodiments of the present invention configure the two logical interfaces of a bidirectional tunnel to operate in bridge mode, encapsulate Layer 2 packets and the protocol type information in tunnel packets at the first logical interface of the two, and transmit the packets to the peer through the bidirectional tunnel; when receiving the tunnel packets at the second logical interface of the two, the embodiments of the present invention transmit the tunnel packets to the corresponding Layer 2 protocol stack for processing according to the protocol type information in the received tunnel packets, thus enabling the logical interfaces of a bidirectional tunnel to operate as Layer 2 ports and transmit Layer 2 packets.

Although the embodiments of the invention and their advantages are described in detail, a person skilled in the art could make various alternations, additions, and omissions without departing from the spirit and scope of the present invention as defined by the appended claims.

The invention claimed is:

1. A method performed by a transmitting device, wherein the transmitting device is to transmit packets to a receiving device via a tunnel, and wherein the tunnel includes a first logical interface belonging to the transmitting device and a second logical interface belonging to the receiving device, the method comprising:
setting, by the transmitting device, a bit of a message to a predetermined value that enables the first logical interface of the tunnel to operate in a bridge mode;
transmitting the message from the transmitting device to the receiving device, wherein the message further includes a bidirectional tunnel identifier (ID) to identify the tunnel and an address of the transmitting device;
receiving a response from the receiving device, wherein the response includes the bidirectional tunnel ID of the tunnel and the address of the transmitting device, thereby establishing the tunnel as a bidirectional tunnel between the transmitting device and the receiving device;
encapsulating information in a tunnel packet; and
transmitting the tunnel packet to the receiving tunnel device through the first logical interface of the tunnel.

2. The method of claim 1, wherein the bidirectional tunnel ID is carried in a BIDIRECTIONAL_ATTRIBUTE object of the message.

3. The method of claim 2, wherein the bit of the message is a mode bit indicating whether the first logical interface of the tunnel operates in a bridge mode or a route mode.

4. The method of claim 1, wherein an Internet Protocol (IP) address associated with the first logical interface is carried in the message.

5. The method of claim 1, wherein the encapsulated information comprises a layer-2 frame.

6. A method performed by a receiving device, the method comprising:
receiving a message from a transmitting device via a tunnel, wherein the message includes a bit having a predetermined value indicating that a first logical interface of the tunnel operates in a bridge mode, a bidirectional tunnel identifier (ID) identifying the tunnel, and an address of the transmitting device;
searching logical interfaces of local tunnels to determine whether one of the logical interfaces of the local tunnels specifies the same bidirectional tunnel ID and bridge mode as those in the message;
in response to a determination that a matched logical interface is found, transmitting a response to the transmitting device via the matched logical interface, wherein the response includes the bidirectional tunnel ID of the tunnel and the address of the transmitting device, thereby establishing the tunnel as a bidirectional tunnel between the transmitting device and the receiving device.

7. The method of claim 6, wherein the matched logical interface specifies a destination Internet Protocol (IP) address, and the method further comprises:
determining whether the destination IP address of the matched logical interface matches the address of the transmitting device.

8. The method of claim 6, wherein the message from the transmitting device is a Resource Reservation Protocol (RSVP) PATH message.

9. The method of claim 8, wherein the response transmitted by the receiving device is RSVP RESV message.

10. The method of claim 6, further comprising:
receiving, from the transmitting device, a layer-2 frame on the bidirectional tunnel; and
sending the layer-2 frame to a corresponding layer-2 protocol stack for processing.

11. The method of claim 6, wherein the bidirectional tunnel ID is carried in a BIDIRECTIONAL_ATTRIBUTE object of the message.

12. The method of claim 11, wherein the BIDIRECTIONAL_ATTRIBUTE object includes the bit indicating whether the first logical interface of the transmitting device is in a bridge mode or a route mode.

13. A system comprising:
a first device;
a second device; and
a tunnel having a first logical interface residing on the first device and a second logical interface residing on the second device,
wherein the first device is to set a bit of a message to a predetermined value that enables the first logical interface of the tunnel to operate in a bridge mode, and transmit the message to the second device, wherein the message further includes a bidirectional tunnel identifier (ID) of the tunnel and an address of the first device, and
wherein in response to receiving the message via the second logical interface of the tunnel, the second device is to transmit a response containing the bidirectional tunnel ID to the first device, thereby establishing the tunnel as a bidirectional tunnel between the first device and the second device.

14. The system of claim 13, wherein before transmitting the response, the second device is to
search logical interfaces of local tunnels to determine whether one of the logical interfaces of the local tunnels specifies the same bidirectional tunnel ID and bridge mode as those in the message,
in response to a determination that a matched logical interface is found, determine whether a destination address of the matched logical interface is the same as the address of the first device, and
in response to a determination that the destination address of the matched logical interface is the same as the address of the first device, utilize the matched logical interface as the second logical interface to transmit the response to the first device.

15. The system of claim 13, wherein the first device transmits a layer-2 frame on the bidirectional tunnel via the first logical interface, the second device receives the layer-2 from the bidirectional tunnel via the second logical interface, and the second device sends the layer-2 frame to a corresponding layer-2 protocol stack for processing.

16. The system of claim 13, wherein the bidirectional tunnel ID is carried in a BIDIRECTIONAL_ATTRIBUTE object of the message.

* * * * *